United States Patent
Izumiura et al.

[19]

[11] Patent Number: 5,983,714
[45] Date of Patent: Nov. 16, 1999

[54] SYSTEM FOR DETECTING FAILURE OF FUEL PRESSURE SENSOR

[75] Inventors: Atsushi Izumiura; Akira Murakami; Atsushi Kato; Shigeo Hidai; Seiichi Hosogai, all of Wako, Japan

[73] Assignee: Honda Giken Kogyo Kabushiki Kaisha, Tokyo, Japan

[21] Appl. No.: 09/137,821

[22] Filed: Aug. 21, 1998

[30] Foreign Application Priority Data

Aug. 22, 1997 [JP] Japan .................................. 9-241802

[51] Int. Cl.[6] .................................. G01M 15/00
[52] U.S. Cl. .................................. 73/118.1
[58] Field of Search .................... 73/118.1, 1.57

[56] References Cited

U.S. PATENT DOCUMENTS 5,771,861  6/1998  Musser et al. .

Primary Examiner—Robert Raevis
Attorney, Agent, or Firm—Nikaido, Marmelstein, Murray & Oram LLP

[57] ABSTRACT

A system for detecting failure of a fuel pressure sensor in an internal combustion engine, including an injector (32) provided at an intake system of the engine downstream of a throttle valve (38), a fuel supply passage (16) connected to a fuel supply source (fuel tank 12) for supplying fuel to the injector (32), pressure regulator (28) provided in the fuel supply passage (16) and operating to maintain a difference between the fuel pressure (PF2A) and the manifold absolute pressure at a constant value, a fuel pressure sensor (PF2 sensor 54) for detecting the fuel pressure (PF2A) in the fuel supply passage (16) downstream of the pressure regulator, and a manifold absolute pressure sensor (62) for detecting the manifold absolute pressure (PBA) downstream of the throttle valve (38). In the system, an index indicative of a ratio (ΔPF2A) of the fuel pressure (PF2A) fluctuation relative to the manifold absolute pressure (PBA) fluctuation is compared to reference values (#PF2L, #PF2H) which define a range. Sensor failure is discriminated when the index (ΔPF2A) is found to have remained outside of the range for a predetermined maximum time (tmP2STK). The system enables rapid and accurate detection of fuel pressure sensor abnormality (failure).

9 Claims, 3 Drawing Sheets

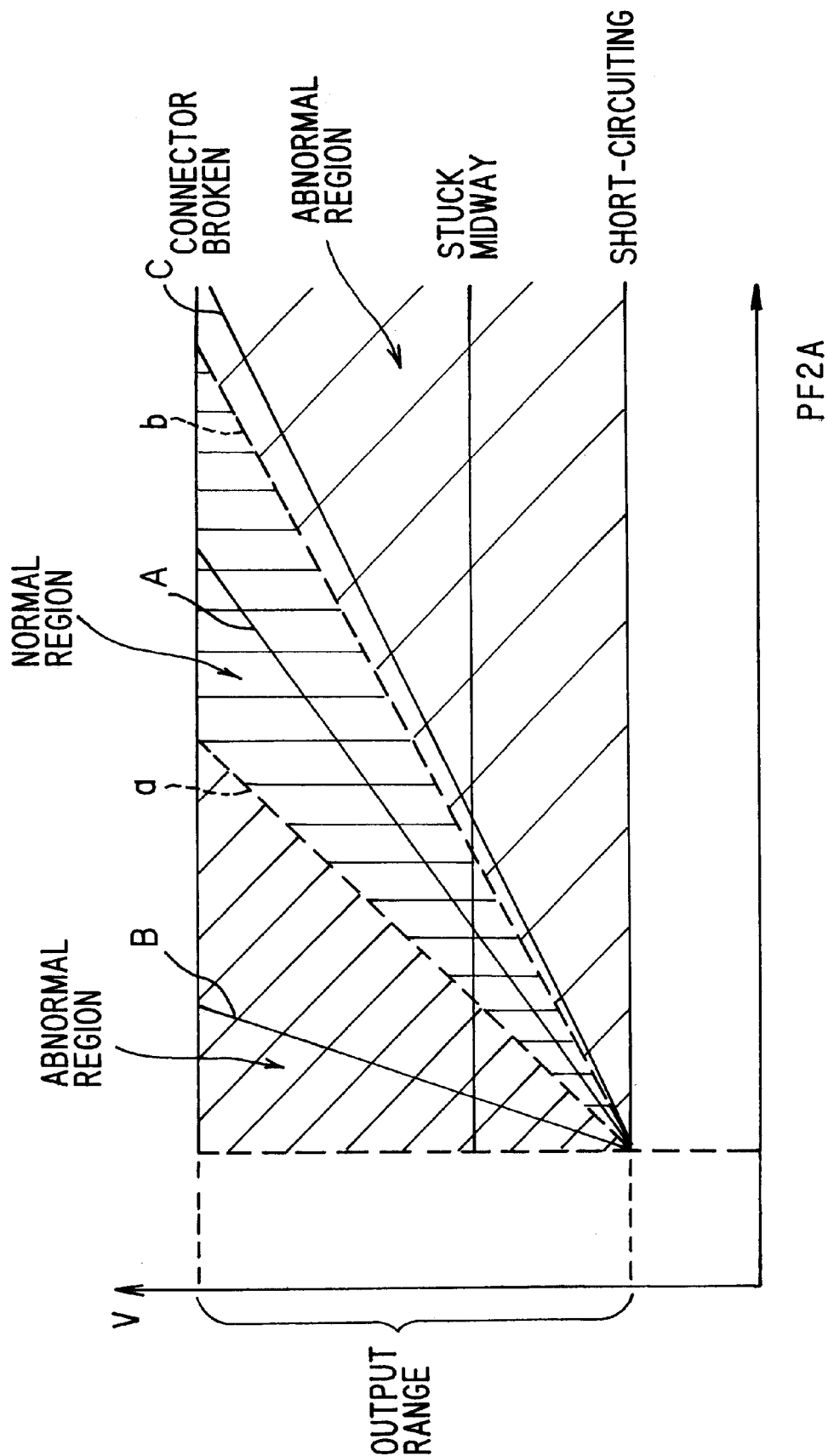

SYSTEM FOR DETECTING FAILURE OF FUEL PRESSURE SENSOR

BACKGROUND OF THE INVENTION

1. Field of the Invention

This invention relates to a system for detecting failure of a fuel pressure sensor, particularly to a system for, in an internal combustion engine employing natural gas as fuel, discriminating failure of fuel supply line pressure detecting means or fuel pressure sensor from fluctuation in air intake pipe pressure.

2. Description of the Related Art

An internal combustion engine powered by compressed natural gas was recently proposed in Japanese Laid-open Patent Application No. 7(1995)-217,485. In this type of engine, methane or other natural gas stored in a fuel tank (gas cylinder) under high pressure (250 kg/cm$^2$) is supplied to fuel injection valves through a fuel supply passage (line).

A pressure regulator inserted in the fuel supply line regulates the pressure of the high-pressure natural gas to around 2 kg/cm$^2$, more exactly so as to maintain the pressure differential between the supplied fuel pressure and the air intake pipe pressure at a constant value. A pressure sensor is provided to detect the fuel supply line pressure downstream of the pressure regulator.

Since desired fuel injection control cannot be conducted when this pressure sensor experiences a broken electrical connector, a shift in output characteristic or other such abnormality (failure), rapid and accurate detection of pressure sensor abnormality (failure) is desirable.

SUMMARY OF THE INVENTION

An object of the invention is therefore to provide a system for detecting failure of a fuel pressure sensor that utilizes the correlation between fuel pressure and air intake pipe pressure to enable rapid and accurate detection of abnormal or faulty operation of a pressure sensor for detecting fuel supply line pressure downstream of the regulator.

To achieve this object, the invention provides a system for detecting failure of a fuel pressure sensor in an internal combustion engine, including an injector (32) provided at an intake system of the engine downstream of a throttle valve (38), a fuel supply passage (16) connected to a fuel supply source (fuel tank 12) for supplying fuel to the injector (32), a pressure regulator (28) provided in the fuel supply passage (16) and operating to maintain a difference between a fuel pressure (PF2A) and a manifold absolute pressure (PBA) at a constant value, a fuel pressure sensor (PF2 sensor 54) for detecting the fuel pressure (PF2A) downstream of the pressure regulator (28) in the fuel supply passage (16), and a manifold absolute pressure sensor (62) for detecting the manifold absolute pressure (PBA) downstream of the throttle valve (38). In the system, a pressure sensor failure detecting means (ECU 20, S10–S34) determines an index (ΔPF2A) indicative of a fluctuation of the fuel pressure (PF2A) relative to a fluctuation of the manifold absolute pressure (PBA), and detects failure of the fuel pressure sensor by comparing the index (ΔPF2A) with a reference value (#PF2L, #PH2H).

BRIEF EXPLANATION OF THE DRAWINGS

This and other objects and advantages of the invention will be more apparent from the following description and drawings, in which:

FIG. 3 is a fuel pressure sensor output characteristic diagram for explaining the operation according to the flow chart of FIG. 2.

DETAILED DESCRIPTION OF THE PREFERRED EMBODIMENT

An embodiment of the invention will now be explained with reference to the attached drawings.

Figure 1:
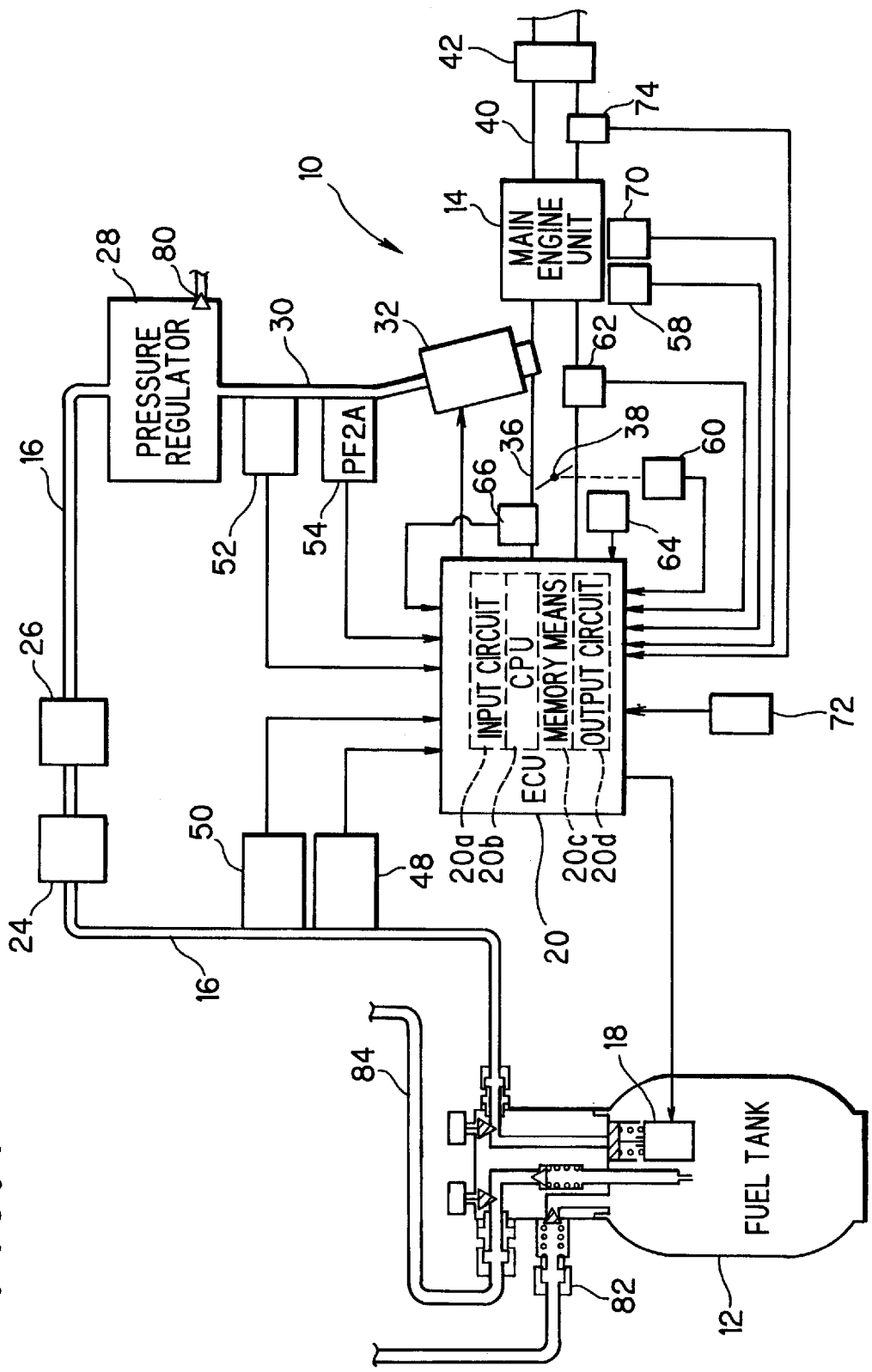
FIG. 1 is a schematic diagram showing the overall configuration of a system for detecting failure of a fuel pressure sensor according to the invention.

FIG. 1 is an overall schematic view of an internal combustion engine fuel metering control system to which the invention is applied, wherein a compressed natural gas (CNG) engine is taken as an example of the internal combustion engine for the purpose of explanation.

Reference numeral 10 in the drawing designates a four-cylinder internal combustion engine. The engine 10 is equipped with a fuel tank (gas cylinder) 12 containing compressed natural gas composed mainly of methane at a high pressure such as 250 kg/cm$^2$ (24.5 MPa). A high-pressure fuel supply passage (line) 16 is connected to the fuel tank 12 for supplying the high-pressure gas stored therein to a main engine unit 14.

An in-tank solenoid valve 18 is provided at the port of the fuel tank 12 to which the high-pressure fuel supply passage (line) 16 is connected. The in-tank solenoid valve 18 is electrically connected to an electronic control unit (ECU) 20. The ECU 20 controls the supply/cutoff of high-pressure gas to the main engine unit 14 by sending the in-tank solenoid valve 18 open/close signals that energize/de-energize its solenoid (not shown).

The high-pressure fuel supply passage (line) 16 passes through a manual cutoff valve 24 and a filter 26 and its end remote from the fuel tank 12 is connected to a pressure regulator 28. The pressure regulator 28 reduces the pressure of the high-pressure gas received from the fuel tank 12 through the high-pressure fuel supply passage (line) 16 and mechanically operates to maintain the pressure differential relative to the air intake pipe pressure at a constant value of, for example, 2.55 kg/m$^2$ (0.25 MPa) and supplies the reduced-pressure gas to a low-pressure fuel supply passage (line) 30. The low-pressure fuel supply passage (line) 30 is connected with, and passes the reduced-pressure gas to, fuel injectors 32 (only one shown).

An air intake pipe 36 is connected to the main engine unit 14. Air drawn into the air intake pipe 36 through an air cleaner mounted on its far end (not shown) advances to the locations of the fuel injectors 32 installed on the upstream side of the individual cylinder combustion chambers, while the flow thereof is adjusted by a throttle valve 38.

The fuel injectors 32 are electrically connected to the ECU 20 and, as explained further later, open to inject reduced-pressure gas at prescribed injection timings (crank angle intervals) in response to commands received from the ECU 20. The injected gas mixes with the intake air to form an air-fuel mixture that is supplied to the cylinder combustion chambers through associated intake valves (not shown). The air-fuel mixture is ignited in the cylinders in the order of the first, third, fourth and second by associated spark plugs (not shown). The resulting combustion of the air-fuel mixture drives down a piston (not shown).

The exhaust gas produced by the combustion is discharged through an exhaust valve (not shown) into an exhaust manifold (not shown), from where it passes through an exhaust pipe 40 to a catalytic converter (three-way catalytic converter) 42 to be purified and then discharged to the exterior.

The high-pressure fuel supply passage (line) 16 is equipped with a first temperature sensor 48 and a first pressure sensor 50 that produce signals indicative of the temperature and pressure of the gas in the high-pressure fuel supply line 16.

The low-pressure fuel supply passage (line) 30 is equipped with a second temperature sensor 52 that produces a signal indicative of the temperature of the gas in the low-pressure fuel supply passage (line) 30 and with a second pressure sensor 54 that produces a signal indicative of the pressure PF2A of the gas in the low-pressure fuel supply passage (line) 30 after pressure reduction by the pressure regulator 28. (The second pressure sensor is hereinafter called "PF2 sensor.").

As pointed out earlier, the pressure regulator 28 reduces the pressure of the high-pressure gas received through the high-pressure fuel supply passage (line) 16 from the fuel tank 12 and in response to a command sent from the ECU, maintains the pressure difference relative to the manifold pressure downstream of the throttle valve 38 at a fixed value (e.g., 2.55 kg/cm$^2$), and feeds the reduced-pressure gas into the low-pressure fuel supply passage 30.

A crank angle sensor 58 installed in the vicinity of the crankshaft (not shown) or the like of the main engine unit 14 produces a CYL pulse at BTDC 100 degrees of the first cylinder, a TDC pulse at BTDC 10 degrees of every cylinder, and a CRANK pulse once every crank angle of 30 degrees.

A throttle position sensor 60 associated with the throttle valve 38 outputs a signal indicative of the degree of opening TH of the throttle valve 38. A manifold absolute pressure sensor 62 provided in the air intake pipe 36 downstream of the throttle valve 38 outputs a signal indicative of the absolute pressure PBA in the intake pipe. An atmospheric pressure sensor 64 provided at an appropriate location on the engine 10 outputs a signal indicative of the atmospheric pressure PA. An intake air temperature sensor 66 provided upstream of the throttle valve 38 outputs a signal indicative of the temperature of the intake air.

A coolant temperature sensor 70 provided at an appropriate location on the engine outputs a signal indicative of the engine coolant temperature TW. A vehicle speed sensor 72 provided in the vicinity of the drive shaft (not shown) of the vehicle (not shown) powered by the engine 10 outputs a signal indicative of the vehicle traveling speed V.

Further, an O$_2$ sensor (air/fuel ratio sensor) 74 provided in the exhaust system at a confluence point upstream of the catalytic converter 42 outputs a detection signal indicating whether the oxygen concentration of the exhaust gas is rich or lean relative to the stoichiometric air-fuel ratio thereof.

The outputs of all the sensors are sent to the ECU 20.

The ECU 20 comprises an input circuit 20a, a CPU 20b, a memory means 20c and an output circuit 20d. The functions of the input circuit 20a include shaping the waveforms of the input signals from the sensors, converting the levels of the input signals, and converting the analog values of input signals to digital values. The engine speed NE is obtained by counting the CRANK pulses.

The CPU 20b detects failure of the PF2 sensor explained later, calculates a fuel injection quantity suitable for the operating condition, calculates an air/fuel ratio feedback correction coefficient based on the O$_2$ sensor output and uses it to correct the fuel injection quantity, and drives the fuel injectors 32 through the output circuit 20d (and a drive circuit not shown in the drawings). The memory means 20c stores the outputs of the sensors, programs executed by the CPU 20b to effect the aforesaid control, the results of calculations, and the like.

The pressure regulator 28 is equipped with a relief valve 80 for preventing the pressure of the reduced-pressure gas from exceeding its prescribed value. The fuel tank 12 is similarly provided with a relief valve 82. Reference symbol 84 designates a gas charging passage (line).

The operation of the system will now be explained.

Figure 2:
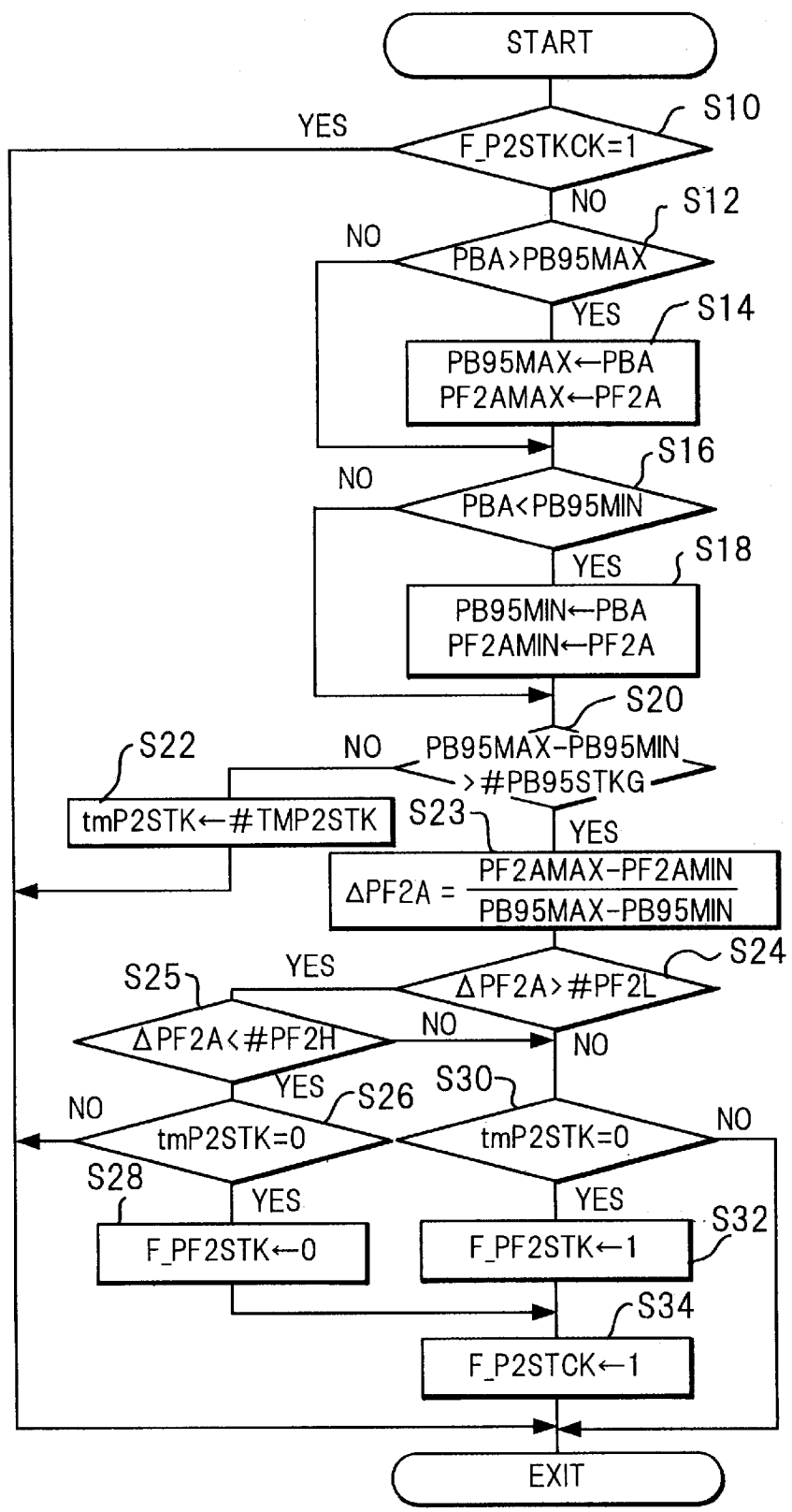
FIG. 2 is a flow chart showing the operation of the system of FIG. 1.

FIG. 2 is a flow chart showing the operation of the system, i.e., the operation of the system for detecting failure of the fuel pressure sensor (the PF2 sensor 54).

First, in S10, it is checked whether the bit of a flag F_P2STKCK is set to 1. This amounts to checking whether the PF2 sensor 54 has already been detected to have experienced a failure such as a broken electrical connector, shift in output characteristic or the like. When the result in S10 is affirmative, the program is immediately terminated because its purpose (failure detection) has already been accomplished.

When the result in S10 is negative, it is checked in S12 whether the detected manifold absolute pressure PBA exceeds a first prescribed value PB95MAX. When the result is affirmative, the program goes to S14, in which the detected manifold absolute pressure PBA is rewritten to the first prescribed value PB95MAX and the detection value PF2A of the PF2 sensor is rewritten to a second prescribed value PF2AMAX. S14 is skipped when the result in S12 is negative.

Next, in S16, it is checked whether the detected manifold absolute pressure PBA is less than a third prescribed value PB95MIN. When the result is affirmative, the program goes to step S18, in which the detected manifold absolute pressure PBA is rewritten to the third prescribed value PB95MIN and the detection value PF2A of the PF2 sensor is rewritten to a fourth prescribed value PF2AMIN. S18 is skipped when the result in S16 is negative. S12 to S18 are preparatory procedures for determining relatively broad fluctuation ranges for PBA and PF2A.

Next, in S20, it is checked whether the difference between the first and third prescribed values exceeds a suitably set first reference value #PB95STKG. When the result is negative, the program goes to S22, in which a timer (down counter) tmP2STK is set to a prescribed value #TMP2STK, down counting (time measurement) is commenced, and the program is terminated.

The failure detection system according to the invention takes advantage of the fact that the manifold absolute pressure PBA and the fuel supply pressure PF2A are correlated parameters, namely, utilizes the fact that a fluctuation in the manifold absolute pressure PBA should be accompanied by a commensurate fluctuation in the fuel supply pressure PF2A.

The manifold absolute pressure PBA and the fuel supply pressure PF2A are monitored and compared. The PF2 sensor is judged to have experienced a failure such as a broken electrical connector, shift in output characteristic or the like when the manifold absolute pressure PBA changes markedly but the change in the fuel supply pressure PF2A remains at or below a prescribed value or when it is extremely large.

When the result in S20 of FIG. 2 is affirmative, i.e., when the change in the manifold absolute pressure is found to exceed the first reference value #PB95STKG, the program goes to S23, in which, as shown, the ratio (index) of the difference between the second and fourth prescribed values to the difference between the first and third prescribed values is calculated and defined as ΔPF2A. Next, in S24, it is checked whether the value of ΔPF2A exceeds a predetermined value #PF2L (explained later). In other words, the equation of S23 is used to discriminate whether the change in PF2A with change in PBA exceeds a certain magnitude.

When the result in S24 is affirmative, it is checked in S25 whether ΔPF2A is less than another value #PF2H (explained later). When the result in S25 is affirmative, it is checked in S26 whether the value of the timer tmP2STK has reached zero. When the result is negative, the program is terminated. When the result in S26 becomes affirmative in the next or a later program cycle, the program goes to S28, in which the bit of a flag F_PF2STK is reset to 0. This indicates that the PF2 sensor 54 is normal.

On the other hand, when the result in S24 or S25 is negative, it is checked in S30 whether the timer value has reached zero. When the result is negative, the program is terminated, and when affirmative, the bit of the flag F_PF2STK is set to 1 in S32. This indicates that a failure (abnormality) has arisen in the PF2 sensor 54.

The processing of S24 and S25 will be explained with reference to FIG. 3, which shows how the output voltage V of the PF2 sensor varies as a function of PF2A under different conditions. As shown, no change in output voltage with change in PF2A is observed when the sensor experiences a broken electrical connector, short-circuiting or sticks midway. As represented by A, in the region bounded by broken lines a and b and marked with vertical lines, the sensor is normal. As represented by B and C, when the sensor characteristic is outside the normal region, the change in output voltage with change in PF2A becomes large (B) or small (C) excessively. The values #PF2L and #PF2H used as reference values for comparison in S24 and S25 are calculated with reference to b and a, respectively.

Specifically, the slopes of a and b in FIG. 3 indicate the rate of change in the fuel supply pressure PF2A with change in the manifold absolute pressure PBA. #PF2L is set as a value analogous to b and the sensor is judged to be abnormal (to have failed) if the ratio of change in PF2A to change in PBA does not exceed #PF2L. #PF2H is set as a value analogous to b and the sensor is judged to be abnormal if the ratio of change in PF2A to change in PBA is not less than #PF2H.

Returning to the explanation of FIG. 2, next, in S34, the bit of the flag F_P2STCK is set to I to indicate that the PF2 sensor 54 has been found to have failed. It will be noted that an affirmative or negative result in S24 is not immediately followed by a decision that the PF2 sensor is normal or has failed. Instead the decision is made after the passage of the prescribed time period #TMP2STK. This confirmation that the normal or abnormal state continues for the prescribed period enhances the reliability of the normal/abnormal decision.

Taking advantage of the fact that the manifold absolute pressure PBA and the fuel supply pressure PF2A are correlated, the embodiment explained in the foregoing judges that the PF2 sensor has failed (is abnormal) based on the change in the fuel supply pressure PF2A observed when a change in the manifold absolute pressure PBA is detected. Specifically, it judges that the PF2 sensor has failed (is abnormal) when the manifold absolute pressure PBA changes by more than a prescribed amount but the fuel supply pressure PF2A does not change by more than a prescribed amount or when it changes by an extremely large amount (more specifically, when the ratio ΔPF2A of the change in the fuel supply pressure PF2A to the change in the manifold absolute pressure PBA is not in the prescribed range #PF2L, H). As such, this embodiment can detect failure of the PF2 sensor rapidly and with high accuracy.

The fact that the judgment is made after the passage of a prescribed time period further enhances the accuracy of the detection. Since the detection of failure is effected by logical operation, it can be achieved without need for additional hardware components or increased cost.

The embodiment is thus configured to have a system for detecting failure of a fuel pressure sensor in an internal combustion engine, including an injector (32) provided at an intake system of the engine downstream of a throttle valve (38), a fuel supply passage (16) connected to a fuel supply source (fuel tank 12) for supplying fuel to the injector (32), a pressure regulator (28) provided in the fuel supply passage (16) and operating to maintain a difference between a fuel pressure (PF2A) and a manifold absolute pressure (PBA) at a constant value, a fuel pressure sensor (PF2 sensor 54) for detecting the fuel pressure (PF2A) downstream of the pressure regulator (28) in the fuel supply passage (16), and a manifold absolute pressure sensor (62) for detecting the manifold absolute pressure (PBA) downstream of the throttle valve (38). In the system, a pressure sensor failure detecting means (ECU 20, S10–S34) determines an index (ΔPF2A) indicative of a fluctuation of the fuel pressure (PF2A) relative to a fluctuation of the manifold absolute pressure (PBA), and detects failure of the fuel pressure sensor by comparing the index (ΔPF2A) with a reference value (#PF2L, #PF2H).

In the system, said pressure sensor failure detecting means includes: index determining means (ECU 20, S10–S23) for determining the index (ΔPF2A) in terms of a ratio of the fuel pressure (PF2A) relative to the manifold absolute pressure (PBA), when the fluctuation of the manifold absolute pressure (PBA) is found to be greater than a prescribed value (PB95MAX, PB95MIN); determining means (ECU 20, S24, S25) for determining whether the index (ΔPF2A) is within a predetermined range (#PF2L, #PF2H); and failure discriminating means (ECU 20, S32) for discriminating failure of the pressure sensor (PF2 sensor 54) when the index (ΔPF2A) is determined to be outside of the predetermined range.

In the system, said failure discriminating means includes time measuring means (ECU 20, S22, S26, S30) for measuring a time (tmP2STK) since the index (ΔPF2A) was determined to be outside of the predetermined range, and discriminates a failure of the pressure sensor when the measured time (tmP2STK) has reached a predetermined value (i.e.: 0) since the index (ΔPF2A) was determined to be outside of the predetermined range.

In the system, said index determining means includes: first comparing means (ECU 20, S12, S14) for comparing the manifold absolute pressure (PBA) with a first prescribed value (PB95MAX) and for, when the manifold absolute pressure (PBA) exceeds the prescribed value (PB95MAX), rewriting the manifold pressure (PBA) to the prescribed value (PB95MAX) and the fuel pressure (PF2A) to a second prescribed value (PF2AMAX); second comparing means (ECU 20, S16, S18) for comparing the manifold absolute pressure (PBA) with a third prescribed value (PB95MIN) and for, when the manifold absolute pressure (PBA) is less than the prescribed value (PB95MIN), rewriting the manifold absolute pressure (PBA) to the prescribed value (PB95MIN) and the fuel pressure (PF2A) to a fourth prescribed value (PF2AMIN); and index calculating means (ECU 20,S23) for calculating the index (ΔPF2A) in terms of a ratio of the fuel pressure (PF2A) relative to the manifold absolute pressure (PBA), by dividing a difference between the second and fourth prescribed values by a difference between the first and third prescribed values (PF2AMAX–PF2AMIN/PB95MAX–PB95MIN).

The system according to the invention thus enables rapid and accurate detection of fuel pressure sensor abnormality (failure). The invention can be implemented without cost increase since it achieves detection by software techniques not requiring additional components.

Although an embodiment was explained taking a compressed natural gas engine as an example, the invention can also be applied to engines that use liquid fuels such as gasoline, diesel fuel or ethanol. Application to engines powered by liquid natural gas (LNG) is also possible.

Although the invention has thus been shown and described with reference to specific embodiments, it should be noted that the invention is in no way limited to the details of the described arrangements but changes and modifications may be made without departing from the scope of the invention, which is defined by the appended claims.

What is claimed is:

1. A system for detecting failure of a fuel pressure sensor in an internal combustion engine, comprising:

an injector (32) provided at an intake system of the engine downstream of a throttle valve (38);

a fuel supply passage (16) connected to a fuel supply source (fuel tank 12) for supplying fuel to the injector (32);

a pressure regulator (28) provided in the fuel supply passage (16) and operating to maintain a difference between a fuel pressure (PF2A) and a manifold absolute pressure (PBA) at a constant value;

a fuel pressure sensor (PF2 sensor 54) for detecting the fuel pressure PF2A downstream of the pressure regulator (28) in the fuel supply passage (16);

a manifold absolute pressure sensor (62) for detecting the manifold absolute pressure (PBA) downstream of the throttle valve (38); and pressure sensor failure detecting means (ECU 20, S10–S34) for determining an index (ΔPF2A) indicative of a fluctuation of the fuel pressure (PF2A) relative to a fluctuation of the manifold absolute pressure (PBA), and for detecting failure of the fuel pressure sensor by comparing the index (ΔPF2A) with a reference value (#PF2L, #PF2H).

2. A system according to claim 1, wherein said pressure sensor failure detecting means includes:

index determining means (ECU 20, S10–S23) for determining the index (ΔPF2A) in terms of a ratio of the fuel pressure (PF2A) relative to the manifold absolute pressure (PBA), when the fluctuation of the manifold absolute pressure (PBA) is found to be greater than a prescribed value (PB95MAX, PB95MIN);

determining means (ECU 20, S24, S25) for determining whether the index (ΔPF2A) is within a predetermined range (#PF2L, #PF2H); and failure discriminating means (ECU 20, S32) for discriminating failure of the pressure sensor (PF2 sensor 54) when the index (ΔPF2A) is determined to be outside of the predetermined range.

3. A system according to claim 2, wherein said failure discriminating means includes:

time measuring means (ECU 20, S22, S26, S30) for measuring a time (tmP2STK) since the index (ΔPF2A) was determined to be outside of the predetermined range;

wherein said failure discriminating means discriminates a failure of the pressure sensor when the measured time (tmP2STK) has reached a predetermined value (i.e.: 0) since the index (ΔPF2A) was determined to be outside of the predetermined range.

4. A system according to claim 2, wherein said index determining means includes;

first comparing means (ECU 20, S12, S14) for comparing the manifold absolute pressure (PBA) with a first prescribed value (PB95MAX) and for, when the manifold absolute pressure (PBA) exceeds the prescribed value (PB95MAX), rewriting the manifold pressure (PBA) to the prescribed value (PB95MAX) and the fuel pressure (PF2A) to a second prescribed value (PF2AMAX);

second comparing means (ECU 20, S16, S18) for comparing the manifold absolute pressure (PBA) with a third prescribed value (PB95MIN) and for, when the manifold absolute pressure (PBA) is less than the prescribed value (PB95MIN), rewriting the manifold absolute pressure (PBA) to the prescribed value (PB95MIN) and the fuel pressure (PF2A) to a fourth prescribed value (PF2AMIN); and index calculating means (ECU 20,S23) for calculating the index (ΔPF2A) in terms of a ratio of the fuel pressure (PF2A) relative to the manifold absolute pressure (PBA), by dividing a difference between the second and fourth prescribed values by a difference between the first and third prescribed values (PF2AMAX−PF2AMIN/PB95MAX−PB95MIN).

5. A method of detecting failure of a fuel pressure sensor in an internal combustion engine, including:

an injector (32) provided at an intake system of the engine downstream of a throttle valve (38);

a fuel supply passage (16) connected to a fuel supply source (fuel tank 12) for supplying fuel to the injector (32);

a pressure regulator (28) provided in the fuel supply passage (16) and operating to maintain a difference between a fuel pressure (PF2A) and a manifold absolute pressure (PBA) at a constant value;

a fuel pressure sensor (PF2 sensor 54) for detecting the fuel pressure (PF2A) downstream of the pressure regulator (28) in the fuel supply passage (16); and a manifold absolute pressure sensor (62) for detecting the manifold absolute pressure (PBA) downstream of the throttle valve (38);

wherein the improvement comprises the step of:

determining an index (ΔPF2A) indicative of a fluctuation of the fuel pressure (PF2A) relative to a fluctuation of the manifold absolute pressure (PBA), and detecting failure of the fuel pressure sensor by comparing the index (ΔPF2A) with a reference value (#PF2L, #PH2H).

6. A method according to claim 5, wherein said step of pressure sensor failure detecting includes the steps of:

determining the index (ΔPF2A) in terms of ratio of the fuel pressure (PF2A) relative to the manifold absolute pressure (PBA), when the fluctuation of the manifold absolute pressure (PBA) is found to be greater than a prescribed value (PB95MAX, PB95MIN);

determining whether the index (ΔPF2A) is within a predetermined range (#PF2L, #PF2H); and discriminating failure of the pressure sensor (PF2 sensor 54) when the index (ΔPF2A) is determined to be outside of the predetermined range.

7. A method according to claim 6, wherein said step of failure discriminating includes the steps of:

measuring a time (tmP2STK) since the index (ΔPF2A) was determined to be outside of the predetermined range; and discriminating failure of the pressure sensor when the measured time (tmP2STK) has reached a predetermined value (i.e.: 0) since the index (ΔPF2A) was determined to be outside of the predetermined range.

8. A method according to claim 6, wherein said step of index determining includes the steps of;

comparing the manifold absolute pressure (PBA) with a first prescribed value (PB95MAX) and, when the manifold absolute pressure (PBA) exceeds the prescribed value (PB95MAX), rewriting the manifold pressure (PBA) to the prescribed value (PB95MAX) and the fuel pressure (PF2A) to a second prescribed value (PF2AMAX);

comparing the manifold absolute pressure (PBA) with a third prescribed value (PB95MIN) and, when the manifold absolute pressure (PBA) is less than the prescribed value (PB95MIN), rewriting the manifold absolute pressure (PBA) to the prescribed value (PB95MIN) and the fuel pressure (PF2A) to a fourth prescribed value (PF2AMIN); and calculating the index (ΔPF2A) in terms of a ratio of the fuel pressure (PF2A) relative to the manifold absolute pressure (PBA), by dividing a difference between the second and fourth prescribed values by a difference between the first and third prescribed values (PF2AMAX−PF2AMIN/PB95MAX−PB95MIN).

9. A computer program embodied on a computer-readable medium for detecting failure of a fuel pressure sensor in an internal combustion engine and to be used in a system having:

an injector (32) provided at an intake system of the engine downstream of a throttle valve (38);

a fuel supply passage (16) connected to a fuel supply source (fuel tank 12) for supplying fuel to the injector (32);

a pressure regulator (28) provided in the fuel supply passage (16) and operating to maintain a difference between a fuel pressure (PF2A) and a manifold absolute pressure (PBA) at a constant value;

a fuel pressure sensor (PF2 sensor 54) for detecting the fuel pressure (PF2A) downstream of the pressure regulator (28) in the fuel supply passage (16); and a manifold absolute pressure sensor (62) for detecting the manifold absolute pressure (PBA) downstream of the throttle valve (38);

wherein said computer program comprises the steps of:

determining an index (ΔPF2A) indicative of a fluctuation of the fuel pressure (PF2A) relative to a fluctuation of the manifold absolute pressure (PBA), and detecting failure of the fuel pressure sensor by comparing the index (ΔPF2A) with a reference value (#PF2L, #PF2H).

* * * * *